United States Patent
Boutrot et al.

(10) Patent No.: US 11,465,112 B2
(45) Date of Patent: Oct. 11, 2022

(54) DEVICE FOR DISPENSING A FLUID, WHICH DEVICE CAN BE ARRANGED IN A REACTOR COMPRISING A FIXED CATALYTIC BED

(71) Applicant: AXENS, Rueil Malmaison (FR)

(72) Inventors: Catherine Boutrot, Chatou (FR); Jean-Francois Le Coz, Saint Germain en Laye (FR)

(73) Assignee: AXENS, Rueil Malmaison (FR)

( * ) Notice: Subject to any disclaimer, the term of this patent is extended or adjusted under 35 U.S.C. 154(b) by 0 days.

(21) Appl. No.: 17/258,902

(22) PCT Filed: Jun. 27, 2019

(86) PCT No.: PCT/EP2019/067109
§ 371 (c)(1),
(2) Date: Jan. 8, 2021

(87) PCT Pub. No.: WO2020/011542
PCT Pub. Date: Jan. 16, 2020

(65) Prior Publication Data
US 2021/0322942 A1    Oct. 21, 2021

(30) Foreign Application Priority Data
Jul. 10, 2018    (FR) ........................... 1856334

(51) Int. Cl.
*B01J 4/00*    (2006.01)
*B01J 8/00*    (2006.01)
*B01J 8/02*    (2006.01)

(52) U.S. Cl.
CPC ............ *B01J 4/002* (2013.01); *B01J 8/0085* (2013.01); *B01J 8/025* (2013.01); *B01J 8/0278* (2013.01);
(Continued)

(58) Field of Classification Search
CPC ..... B01J 4/00; B01J 4/001; B01J 4/002; B01J 4/004; B01J 8/00; B01J 8/008;
(Continued)

(56) References Cited

U.S. PATENT DOCUMENTS 2,461,331 A    2/1949    Leesemann
3,489,529 A *  1/1970    Dudych ................. B01J 8/0492
                                                     422/607
(Continued)

FOREIGN PATENT DOCUMENTS

CN    105435718 A       3/2016
CN    113578206 A  *  11/2021
(Continued)

OTHER PUBLICATIONS

International Search Report PCT/EP2019/067109 dated Aug. 2, 2019 (pp. 1-3).

*Primary Examiner* — Natasha E Young
(74) *Attorney, Agent, or Firm* — Millen, White, Zelano & Branigan, PC; Ryan Pool (57) ABSTRACT

The invention relates to a device (D) for distributing a fluid, which is able to be arranged in a fixed catalytic bed ($C_1$, $C_2$) of a reactor (R), said device comprising
conveying means for conveying said fluid, comprising a plurality of pipes each directly receiving a distinct share of said fluid,
distribution means for distributing said fluid,
means for generating a local pressure drop in said fluid, such that:
the device comprises manifold means (2a) for collecting said fluid together, and providing the fluidic connection between the pipes of said fluid conveying means and said fluid distribution means,
(Continued)

said means for generating a local pressure drop are added on to said conveying or distribution or manifold (2*a*) means.

19 Claims, 7 Drawing Sheets

(52) U.S. Cl.
CPC .............................. *B01J 2204/002* (2013.01); *B01J 2208/00938* (2013.01)

(58) Field of Classification Search
CPC ........ B01J 8/0085; B01J 8/02; B01J 8/01242; B01J 8/025; B01J 8/0278; B01J 2204/00; B01J 2204/002; B01J 2208/00; B01J 2208/00796; B01J 2208/00938
See application file for complete search history.

(56) References Cited

U.S. PATENT DOCUMENTS

| | | | |
|---|---|---|---|
| 3,992,282 A | 11/1976 | Grosboll et al. | |
| 6,846,469 B1 | 1/2005 | Gupta et al. | |
| 8,092,755 B2 * | 1/2012 | Castagnos, Jr. | ........ B01J 8/1818 422/220 |
| 8,617,385 B2 * | 12/2013 | Daily | ..................... C10G 65/02 208/108 |
| 8,852,537 B2 | 10/2014 | Hooper et al. | |
| 8,900,443 B2 * | 12/2014 | Sechrist | ................. C10G 65/04 208/80 |
| 2004/0068085 A1 | 4/2004 | Belfadhel et al. | |
| 2014/0361222 A1 | 12/2014 | Hooper et al. | |
| 2015/0276332 A1 * | 10/2015 | Ladkat | ................... B01J 8/0457 165/11.1 |

FOREIGN PATENT DOCUMENTS

| | | | | |
|---|---|---|---|---|
| FR | 1213627 A | 4/1960 | | |
| WO | 06032839 A1 | 3/2006 | | |
| WO | 16046834 A1 | 3/2016 | | |
| WO | WO-2017003643 A1 * | 1/2017 | ............. | B01J 4/004 |
| WO | WO-2018001694 A1 * | 1/2018 | ............ | B01J 8/0085 |

* cited by examiner

DEVICE FOR DISPENSING A FLUID, WHICH DEVICE CAN BE ARRANGED IN A REACTOR COMPRISING A FIXED CATALYTIC BED

FIELD OF THE INVENTION

The present invention relates to the field of fluid distribution devices able to be arranged in a reactor comprising a fixed catalytic bed, particularly in reactors in which the catalytic bed is subject to fouling.

Such reactors are encountered in the field of refinery, particularly in hydrotreatment processes, typically for the hydrotreatment of naphtha, in adsorption purification processes, or in certain processes in which either the feedstock contains foulants or foulants are formed in situ.

Indeed, in certain processes, deposits build up on the fixed catalytic bed and progressively over the course of time result in a reduction in the interstitial volume. It has been found that this fouling phenomenon often affects only a limited-thickness layer of the bed, which layer is located at the point at which the fluid comes into contact with the catalytic bed. When considering the example of a vertical reactor using downflow, this is the upper layer of the bed. The layer that becomes fouled notably takes on the appearance of a thick crust composed of a buildup of the elements of which the catalytic bed is composed, covered with and welded together by gums and carbonaceous deposits. Beyond this layer, by a thickness typically comprised between 3 and 20 times the dimension of the elements of which the catalytic bed is composed, the fouling appears to be less. Once the top layer has become fouled, it therefore seems beneficial to be able to distribute the feedstock into the less-fouled underlying layer. In the layer of the bed which becomes fouled, the pressure drop increases progressively, more or less rapidly. In extreme cases, plugging of the catalytic bed is observed. The pressure drop may be such that the operator is obliged to shut down the reactor prematurely and skim off some of the catalytic bed (a procedure known as "skimming"). This maintenance operation consists in replacing the upper layer of the bed which has become clogged with a fresh layer. Shutting down the unit leads to a considerable loss of production. In certain units, regular skimming operations are needed even though the lower part of the catalytic bed is still performing. This loss of production may therefore be recurrent.

The foulants are typically carried in by the feedstock (impurities, residues of corrosion, coke particles coming from the furnace for example) or else formed in situ under the pressure and temperature conditions of the reactor. These foulants may be solid particles, gums, polymers or sticky chemical species.

PRIOR ART

In order to prevent premature clogging of the catalytic bed, there are various technical solutions that have been developed via a plurality of devices installed in the fixed catalytic bed.

When there has been a significant buildup of impurities, the fluid reaching the catalytic bed is distributed between the plurality of devices. Each share of the fluid is then distributed into the layer of the catalytic bed that is situated at the level of the lower part of the device. In this way, the fluid bypasses the catalytic bed over the height of the devices. The increase in pressure drop over the course of time is thus limited. The unit is therefore able to operate for longer before reaching its pressure limit.

An example of this type of device is notably described in U.S. Pat. No. 3,992,282, which describes a plurality of independent vertical cylinders which are distributed through the fixed bed. The upper part of the devices is provided with a restriction orifice and is situated above the upper layer of the fixed bed. The lower part is equipped with screens and immersed in the main bed of catalyst.

U.S. Pat. No. 6,846,469 describes another technical solution, analogous with the previous one, and likewise having a plurality of devices installed in the reactor. Each device allows a share of the feedstock to successively bypass the various layers of the catalytic bed as they progressively become fouled.

These devices are relatively lengthy to install and to uninstall. On the one hand, a great many of these devices are required in order to cover the cross section of a reactor. On the other hand, mounting involves

- positioning each of the devices,
- holding them in place using temporary supports while the catalytic bed is being filled,
- installing the supports that are used in operation.

The removal operation is also lengthy because the reverse steps have to be performed.

Finally, supports for holding the devices and fixing them to the reactor are needed for during operation. During removal, these supports are liable to be situated in the clogged layer and may prove difficult to extract.

SUMMARY OF THE INVENTION

It is an object of the invention to propose a novel design of a distribution device that is easier to fit.

To this end, the invention proposes a device for distributing a fluid, which is able/suitable to be arranged in a fixed catalytic bed of a reactor, said device comprising
  upstream conveying means for conveying said fluid, comprising a plurality of pipes each directly receiving a distinct share of said fluid,
  downstream distribution means for distributing said fluid,
  means for generating a local pressure drop in said fluid, such that:
  the device comprises manifold means for collecting said fluid together, and providing the fluidic connection between said fluid conveying means and said fluid distribution means,
  said means for generating a local pressure drop are added on to said conveying or distribution or manifold means.

It will be appreciated within the meaning of the invention that the pipes "each directly receiving a distinct share of said fluid" means that these pipes are not connected, upstream, to a common distribution means of communal pipe type from which the pipes in question would branch off: rather, each of the pipes receives a portion of the stream of fluid directly from the source of this stream of fluid from the inlet or inlets provided in the reactor for this purpose. It will be appreciated, still in this expression, that "distinct share" means that each pipe receives a share of the same stream of fluid fed to the reactor, and which therefore has the same composition. Portions of this fluid are therefore conveyed in parallel by these pipes. Each of the pipes, without any intermediate element, receives the fluid that is to be distributed. Because of the plurality of pipes, the total quantity of the fluid that is to be distributed is divided between the various pipes into distinct shares, having the same composition. These distinct shares are therefore not mixed in the conveying means.

The means for generating a local pressure drop are added on to the distribution means "in the vicinity of" the region of connection to said manifold means, namely near to the space containing the connecting zone or in said zone.

The device according to the invention forms a complete one-piece device that can easily be mounted in a reactor and perform the distribution function by itself alone.

In the device according to the invention, the risks of poor distribution of the fluid are also minimized through the design of the device. Specifically, the shares of the fluid that are conveyed by the various pipes which are connected to the same manifold means are grouped together and homogenized before being distributed by the distribution means.

Another advantage of the device according to the invention is that it makes it possible to reduce the duration of the skimming operation and the associated loss of production. Mounting it in and removing it from a reactor can be performed very rapidly. It does not need to be held in place while the catalytic bed is being filled or emptied. Neither does it necessarily need to be mechanically attached to the reactor while the unit is in operation, whereas in the prior art, such fixings are installed before the reactor restarts.

In addition, the device according to the invention also proves to be particularly resistant to fouling.

On the one hand, the device performs better in the case of fouling of the conveying means. The fluid is distributed directly between the various conveying pipes and does not enter the device via a single point of entry. Even if some of the pipes are blocked, the manifold means distribute the fluid to all the other distribution means.

On the other hand, the risk of poor distribution associated with the fouling of the distribution means is reduced, because the device comprises a great many distribution means by comparison with the devices of the prior art.

Finally, the means for generating the pressure drop are added on to the manifold, conveying or distribution means, but are distinct from said manifold, conveying or distribution means. Thus, the risk of the means for generating the pressure drop becoming blocked is limited, as too is its impact, should it occur. In addition, the possible blocking of the conveying means or the possible fouling of the distribution means do not have any impact on said means for generating the pressure drop.

DESCRIPTION

Definitions

Throughout the present text, the terms "upstream" and "downstream" or, indifferently, "inlet" and "outlet" should be understood with reference to the overall direction of flow of the fluid concerned. Throughout the present text, "essentially gaseous" should be understood as meaning a fluid made up essentially of gas, and which may contain a small quantity of liquid, typically up to 5 vol % of liquid. Throughout the present text, "essentially liquid" should be understood as meaning a fluid made up essentially of liquid, and which may contain a small quantity of gas, typically up to 5 vol % of gas.

As a preference, the fluid distributed by the device according to the invention is essentially liquid or essentially gaseous.

According to one embodiment, referred to as "simple mode" in the remainder of the text, the device according to the invention comprises single conveying means, single manifold means and single distribution means.

According to an alternative embodiment, referred to as "tiered mode" in the remainder of the text, the device according to the invention comprises a plurality of distribution means, a plurality of manifold means, and transfer means, such that:
said manifold means are arranged one below the other,
said transfer means provide the fluidic connection between the plurality of the manifold means.

The device in said embodiment advantageously allows the fluid to be distributed at different levels.

The various variants which follow apply to both the simple and the tiered embodiments.

In a first variant A, the manifold means for collecting-together said fluid of the device according to the invention comprise at least one tube or an array of tubes, to which the pipes of the conveying means are connected, said tube or tubes being closed at their ends.

In said embodiment, any type of geometry is possible in order to flexibly adapt to all sizes of reactor.

In variant A, said array of tubes of the device is preferably arranged in the form of a cross, a network, a grid or a star. Thus, the device allows homogeneous distribution over a large surface area.

When the array of tubes of the device is arranged in the form of a cross, of a network, of a grid or of a star, the lengths of the various branches is preferably carefully chosen in order to distribute the fluid uniformly. The branches are preferably distributed in a plane. They may also be inclined. They may also be of a wavy shape in order to pass around obstacles, such as sensors or auxiliary piping specific to the reactor and to its operation and independent of the invention. The various possible geometries provide a flexible technical solution that can be adapted to suit the constraints of the space in which the device will be arranged.

In a second variant B, the manifold means for collecting-together said fluid of the device according to the invention comprise at least one ring, preferably of toric or oval or polygonal shape, to which the pipes of the conveying means are connected. In said embodiment, the manifold means are less inclined to become blocked.

As a preference, each of the manifold means for collecting-together the fluid is connected to at least three pipes of the conveying means which each directly receive a distinct share of the fluid.

As a preference, on each of the manifold means, the distribution means are more numerous than the conveying pipes. Advantageously, at least four distribution means are connected to each of the manifold means.

Preferentially, said fluid conveying means and/or the transfer means of the device according to the invention extend along the axis z and each of said fluid-collecting manifold means extend in a plane P, such that the axis z and the plane P form an angle $\alpha$ comprised between 60 and 120 degrees, preferentially an angle of 90 degrees.

Preferentially, the means for generating a local pressure drop of the device according to the invention comprise a restriction in the cross section for passage of the fluid of the restriction orifice, local narrowing or bellows type.

Preferentially, the means for generating a local pressure drop of the device according to the invention comprise a pressure-reducing member that allows a minimal leakage flow and is unable to become blocked due to clogging.

Preferentially, the distribution means of said device according to the invention comprise a plurality of nozzles, connected to said manifold means, said nozzles preferentially extending in the plane P of said manifold means.

Preferentially, the means for generating a local pressure drop of the device according to the invention are added on to the manifold means, in the vicinity of the region of connection to said manifold means.

When the manifold means comprise nozzles, the means for generating a local pressure drop of the device according to the invention are, for preference, added on to said nozzles, in the vicinity of the region of connection to said manifold means.

Preferentially, the angle of connection β of the body of said nozzles with respect to the manifold means is comprised between 60 and 120 degrees, preferentially 90 degrees. The cross section of connection is therefore small, and this maximizes the mechanical strength and minimizes the length of welding bead in instances in which the nozzles are welded to the manifold means.

According to one particularly preferred embodiment, the manifold means comprise a ring to which the pipes of the conveying means and a plurality of nozzles are connected. The means for generating the local pressure drops are preferentially added on at the region of connection between the nozzles and the ring. In this embodiment, the device is effective and exhibits good mechanical integrity.

The invention also relates to a reactor, comprising:
a fixed catalytic bed,
a distribution device according to the invention, arranged in said bed, such that
the inlets of the pipes of the conveying means of said device are upstream or at the level of said bed,
and the manifold, distribution and, where applicable, transfer means of said device are in said bed.

What is to be understood by "the inlets" of the pipes is either the inlet formed by the opening at the upstream end of the pipes in question or at least one inlet or part of the inlets of each of the pipes, notably when, as illustrated later on, there are a plurality of inlets for each pipe, for example when the upstream end is fully or partially blocked and openings are made over a certain height of the wall of the pipe in question in order to constitute the fluid inlets.

What is to be understood by "upstream or at the level of said bed" is that the or at least one of the inlets of the pipes of the conveying means lie flush with the upstream surface of the bed or are at least partially upstream of said bed (therefore above the bed in the case of a reactor arranged vertically with the fluid inlet or inlets at the top of the reactor and the outlet or outlets at the bottom of the reactor). The inlet or inlets of the conveying pipes are situated either entirely above the upper surface of the catalytic bed or at least partially flush with the bed or are partially above/flush with and partially in the catalytic bed. In any case, advantageously, at least one inlet is situated at the surface of the catalytic bed or above (still in the configuration of a reactor oriented vertically fed from the top with withdrawals made from the bottom part of the reactor). The conveying pipes are therefore fully or partially in the catalytic bed, and advantageously open partially outside of the catalytic bed so that its/their fluid inlets are at least partially out of the bed or flush therewith.

The maintenance phases (installing the device, filling or emptying the fixed catalytic bed) for the reactor according to the invention are more rapid than with the technical solutions of the prior art. Specifically, the distribution device does not require holding/temporary supports during the filling or the emptying of the catalytic bed.

The device in the "tiered mode" may also be arranged in the catalytic bed of the reactor according to the invention. The device therefore allows several superposed catalytic layers to be bypassed in succession as they gradually become fouled. The reactor can therefore operate for longer before having to be shut down for skimming.

Preferentially, in the reactor according to the invention, said manifold means of said device extend in a plane orthogonal to the axis of said reactor.

Preferentially, in the reactor according to the invention, it is said fixed catalytic bed according to the invention that supports said device. Thus, mounting the distribution device in the reactor and removing it therefrom can be performed very quickly.

For example, in the case of a vertical, downflow reactor, the elements of the catalytic bed are loaded as far as the level at which the manifold means are to be situated. The device is placed on the catalytic bed by resting the manifold means on the bed. The rest of the catalytic bed is then loaded. Alternatively, in the case of a vertical, upflow reactor, the entirety of the device is suspended at the level of the manifold means. The catalytic bed is then filled.

Optionally, the manifold means of the device may nevertheless be equipped with means of mechanical attachment to the reactor according to the invention. These means of attachment will be sufficient to hold the entire device during the phases of operation. There is therefore no need to attach the conveying and/or distribution means.

In another embodiment, the reactor comprises several devices according to the invention, in limited number; as a preference, two to five distribution devices, for example three or four. The devices may be installed side-by-side, one inside another, or one below another. In this embodiment, the distance between two adjacent distribution means is generally greater than or equal to 2 times and less than or equal to 20 times the cross-sectional diameter of the manifold means, preferentially greater than or equal to 5 times and less than or equal to 10 times the cross-sectional diameter of the manifold means.

As a preference, the fixed catalytic bed of the reactor according to the invention comprises granular solids arranged in successive layers. As a preference, the bed may comprise one or a plurality of layers generally each comprising either trapping elements, referred to as "guard beds", or some inert or active packing, or some catalyst, or some adsorbent. The granular solids typically take the form of extrusions (cylindrical, multilobed, etc.) and/or of pellets and/or of shaped porous elements, for example cross-linked ceramic disks, although other forms do exist. For the sake of simplicity, in the remainder of the text, the term "catalytic element" is employed to refer to the various granular solids of the bed.

As a preference, in the reactor according to the invention, the catalytic bed contains catalytic elements and the dimensions of the outlets of each of said distribution means are strictly smaller than the smallest dimension of said elements at the level of which the fluid is distributed. The dimensions of the outlets of said distribution means are typically the diameter, the height or the width of the passage cross section of the outlet of the nozzles. The dimensions of the catalytic elements are typically the diameter, the height or the width thereof.

The invention also relates to a process employing the distribution device according to the invention and/or the reactor according to the invention, wherein a feedstock containing naphtha, preferentially olefin-rich naphtha, is hydrotreated, or wherein a cracked petroleum feedstock is selectively hydrogenated, or wherein a gas is cleaned of its impurities by adsorption, or any other process employing a reactor with a fixed catalytic bed susceptible to fouling.

In the process according to the invention, the fluid distributed by the device is the feedstock of the reactor employed.

Preferentially, in the "tiered mode", the device according to the invention comprises conveying means, between two and three manifold means arranged one below the other, and between one and two transfer means.

More preferentially, in the tiered embodiment, the device according to the invention comprises conveying means, two manifold means arranged one below the other, and just one transfer means.

Preferentially, the conveying pipes of the device according to the invention are equipped with at least one fluid inlet and one fluid outlet. Each of the inlets of the pipes may advantageously be equipped with means preventing the ingress of solid matter, of the cowl, diaphragm, baffle, screen or equivalent type. The dimensions of the fluid passage cross sections at the inlets to the conveying pipes are therefore preferentially strictly smaller than those of the passage cross section of the means for generating a local pressure drop. That makes it possible to avoid blocking the means for generating a local pressure drop in instances in which particles would pass nonetheless.

In another variant, the conveying means are such that:
- the end of the pipes which is the opposite end to the end connected to the manifold means is closed,
- fluid inlet openings are formed in the lateral part of said pipes. The dimensions of the fluid inlet openings are therefore preferentially strictly smaller than the dimensions of the passage cross section of the means for generating a local pressure drop. That makes it possible to avoid blocking the means for generating a local pressure drop in instances in which particles would pass nonetheless.

Preferentially, the height of the pipes of said conveying means of the device is comprised between 150 and 1000 mm.

In the "simple mode", the height of the device is preferably comprised between 3 and 20 times the largest dimension of the elements that make up the catalytic bed. In the "tiered mode", the height of each tier of the device is preferably comprised between 3 and 20 times the largest dimension of the elements that make up the catalytic bed.

As a preference, the passage cross section of the manifold means and/or of the conveying means and/or of the transfer means is round, oval or parallelepipedal.

The manifold means may comprise at least a straight part and a curved part.

The distribution device according to the invention can be used in all reactors comprising at least one fixed catalytic bed, arranged vertically. Preferentially, the fluid flow is a downflow.

As a preference, the device is made from a material compatible with the operating conditions and the composition of the fluid of the reactor in which it is liable to be placed. Typically, the device is made of metal, preferably of steel, of stainless steel, or of a steel coated with a layer affording protection against corrosion.

Preferentially, in the reactor according to the invention, the distribution device comprises means for generating a local pressure drop such that the pressure drop generated is comprised between one tenth and one times, preferentially between one quarter and three quarters, more preferentially between one third and two thirds, of the pressure drop of the fixed catalytic bed situated between the conveying means and the distribution means.

Preferentially, when the fixed catalytic bed of the reactor according to the invention is not fouled, the device allows the passage of a limited quantity of the fluid. Typically, a quantity of fluid less than or equal to 40 vol % of the fluid, preferentially less than or equal to 30 vol %, preferentially less than or equal to 20 vol % of the fluid, passes through the device as long as the pressure drop in the catalytic bed is lower than that of the device.

Preferentially, when enough impurities have built up, the distribution device allows the fluid to bypass the fouled catalytic layer and be redistributed into a less-fouled underlying layer. Typically, a quantity of fluid greater than or equal to 50 vol %, preferentially greater than or equal to 70 vol %, more preferentially greater than or equal to 80 vol %, of the fluid passes through the device.

In a preferred embodiment, the manifold means may comprise several rings, preferentially two to five, more preferentially two to four, more preferentially still two to three, arranged concentrically in the same plane P. The distance between two adjacent rings is preferably greater than or equal to 3 times and less than or equal to 20 times the largest dimension of the elements of the catalytic bed, more preferentially greater than or equal to 6 times and less than or equal to 16 times the largest dimension of the elements of the catalytic bed. This embodiment allows large-diameter reactors to be equipped.

The person skilled in the art will adapt the configuration of the device (diameter, length and number of conveying, manifold and distribution means) to ensure that the locally-generated pressure drop is far greater than the pressure drops generated by friction in the device.

The person skilled in the art will choose the number of distribution means to ensure that the distribution of the fluid is substantially uniform whatever the distributed fluid flow rate.

Preferentially, the distance between two pipes of the conveying means that are connected to the manifold means is greater than or equal to 100 mm and less than or equal to 1000 mm, preferentially greater than or equal to 400 mm and less than or equal to 800 mm.

Preferentially, each of the distribution means comprises an inlet connected to the manifold means and an outlet opening into the catalytic bed. Said outlet opens freely, namely without a screen or perforated plate at its end. Preferentially, the dimensions of the passage cross section of each of the distribution means are less than the dimensions of the elements of the catalytic bed into which the fluid is distributed. More specifically, the dimensions are preferentially smaller by a difference at least equal to 5% of the largest dimension of the elements of the catalytic bed. For example, the diameter of the outlet of a nozzle of cylindrical shape is strictly smaller than the dimensions of the packing elements into which the fluid is distributed.

In one preferred embodiment, the distribution means comprise nozzles. These nozzles are preferentially cylindrical, but any other shape is conceivable. These nozzles preferentially comprise a restriction orifice located at the inlet of the nozzle.

The length of the distribution means is adjusted in such a way as to distribute the fluid uniformly, notably over the entire cross section of the fixed catalytic bed of the reactor. The distribution means do not necessarily have a uniform length. Such may be the case notably in order to pass around an obstacle located within the reactor or to feed a region of small surface area that does not justify its own distribution piping.

Preferentially, each of the distribution means has means for generating a local pressure drop.

Preferentially, the means for generating a local pressure drop generate a pressure difference greater than or equal to 0.03 MPa and less than or equal to 0.3 MPa, preferentially greater than or equal to 0.05 MPa and less than or equal to 0.12 MPa, when the entirety of the fluid is distributed by the device.

The device may have a modular structure comprising several "segments", in limited number, which are intended to be assembled in the reactor. Each of the "segments" is able to be introduced into the reactor through the manhole.

The manifold means are typically manufactured in several pieces, for example in the form of an arc if the manifold means comprise a ring of toric shape. These segments are mechanically connected by any device known to the person skilled in the art, for example using bolted flanges.

Note that the device of the invention may advantageously have a modular design in order to provide flexibility to suit the needs: thus, more particularly the manifold means, but also the conveying means, may be designed in the form of standard modular elements that can be assembled into different sizes/shapes depending on the reactors to be outfitted. It is possible to provide one, two or three sizes of modules, and with these constitute very varied devices.

The conveying pipes may be connected to the manifold means by any device known to the person skilled in the art: by welding or using bolted flanges.

The distribution means may be welded, bolted or fixed to the manifold means by any means known to the person skilled in the art for mechanically connecting two elements.

Once the device has been assembled, the manifold means of the device according to the invention constitute a base that allows the device to be set down easily on a flat surface. In certain configurations, it is the assembly made up of the distribution means connected to the manifold means of the device that constitutes the base that allows the device to be set down on a flat surface.

Likewise, when the device is arranged in the fixed catalytic bed of a reactor according to the invention, the base of the device advantageously occupies a large proportion of the cross section of the reactor. The device therefore has a significant seating surface. That allows the device to be stable with regard to jolts or mechanical vibrations that occur during operation.

In one embodiment, several distribution devices according to the invention may be used in the reactor. For example, several independent distribution devices, so as to bypass a first fouled upper layer, and then possibly other lower layers when these in their turn become fouled, using successive devices. Typically, two or three successive devices may be installed.

The invention also relates to a process using a reactor according to the invention for the hydrotreatment of a naphtha feedstock. The term hydrotreatment refers to all of the purification processes that allow the various impurities contained in hydrocarbon fractions to be removed through the action of hydrogen.

The hydrotreatment of naphtha is generally used in refinery to purify the naphtha in order to turn it into a feedstock that can typically be used in catalytic reforming or isomerization units or into a monetizable product in a gasoline pool for example. The hydrotreatment process may achieve hydrodesulfurization, hydrodenitrogenation and possibly hydrogenation of the olefins of the feedstock. Naphtha typically comes from a crude oil atmospheric distillation unit or from a thermal cracking unit such as a unit performing coking, pyrolysis or steam cracking, or may come from a hydroconversion unit. These different types of naphtha may be treated individually or as a mixture. The naphthas that come from the cracking units are referred to as cracked naphthas and are rich in olefins.

The process according to the invention is particularly well-suited to the operation of a reactor for the hydrotreatment olefin-rich naphtha, notably cracked naphtha.

The invention also relates to a process using a reactor according to the invention for the selective hydrogenation of the olefins of a cracked petroleum feedstock.

DETAILED DESCRIPTION

The other features and advantages of the invention will become apparent from reading the nonlimiting examples and referring to the figures hereinbelow.

The figures are highly schematic and depict the various components as they are positioned in operating mode.

Figure 1A:
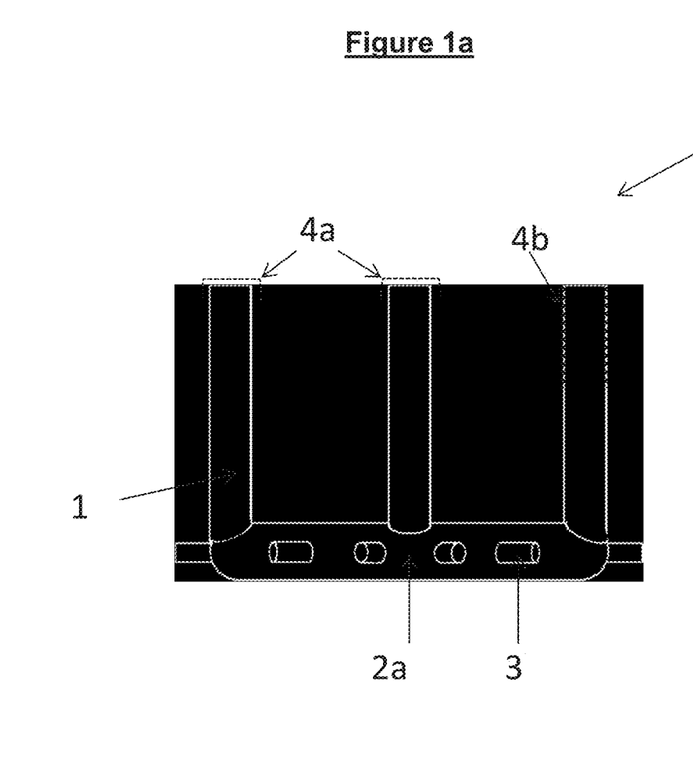
FIG. 1a depicts a transverse view and FIG. 1b a view from above of one example of the distribution device, according to a first variant of the invention in "simple mode".

FIG. 1a depicts a view from above of one example of the distribution device D according to a first variant of the invention, in "simple mode". The device D is made of stainless steel. The pipes 1 of the conveying means consist of vertical cylindrical tubes. The manifold means consist of a ring 2a, of cylindrical cross section and of toric shape, to which the pipes 1 are connected. The distribution means consist of nozzles 3 uniformly distributed around the ring 2a. The pipes 1, the ring 2a and the nozzles 3 are mechanically connected to one another to transport the fluid that is to be distributed from the pipes 1 toward the ring 2a and then from the ring 2a toward the nozzles 3. In the variant depicted, the nozzles 3 extend in the horizontal plane, in which the ring 2a extends.

Optionally, means for preventing the ingress of solid particles into the pipes 1 consist of cowls 4a arranged above the inlet of each pipe. Alternatively, the inlets of the pipes 1 may be blocked off by a solid circular plate and openings may be formed on the exterior envelope of the pipes 4b: these may either be round openings, rectangular openings or slots, or regions with a wide-pitch Johnson™ screen for example.

Figure 1B:
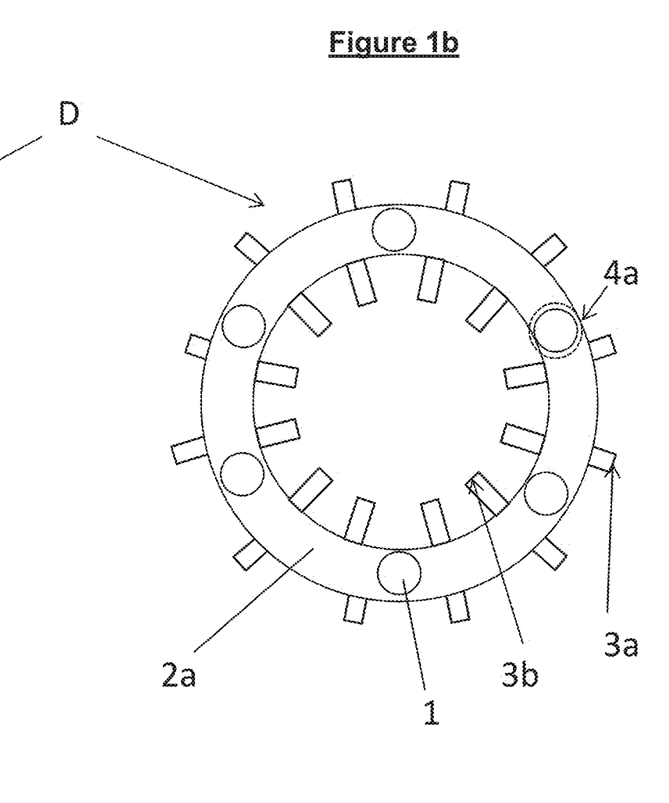

FIG. 1b depicts a view from above of the distribution device D according to the same variant of the invention as FIG. 1a. The nozzles are distributed on either side of the ring 2a: the outlet of one series of nozzles 3a is oriented toward the outside of the ring 2a and the outlet of one series of nozzles 3b is oriented toward the inside of the ring 2a.

Figure 2:
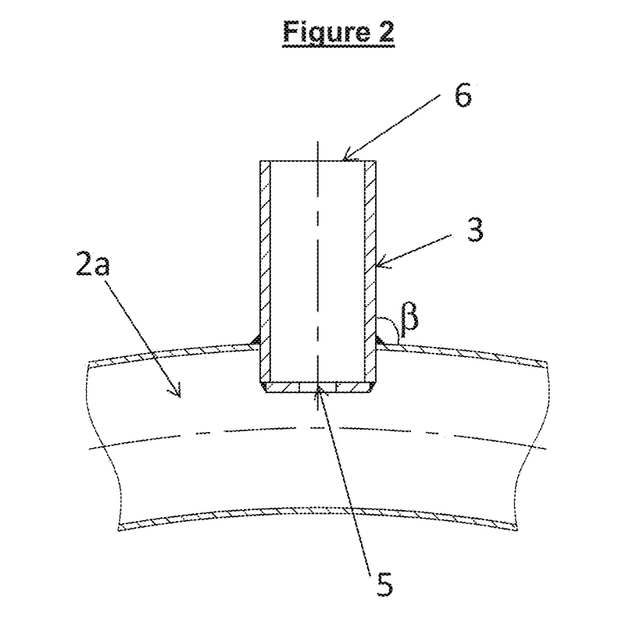
FIG. 2 depicts the view in cross section of the detail of the same distribution device as FIG. 1.

FIG. 2 depicts the view in section of the region of connection between the distribution means and the manifold means in the same variant as FIGS. 1a and 1b. A nozzle 3, consisting of a hollow cylinder, is welded to the ring 2a. A restriction orifice 5 is welded to the inlet of the nozzle 3. Once inside the reactor (see FIG. 5), the outlet 6 of the nozzle opens freely into the catalytic bed and its nominal diameter is less than or equal to the smallest dimension of the elements of the bed and fixed at this level.

Figure 3A:
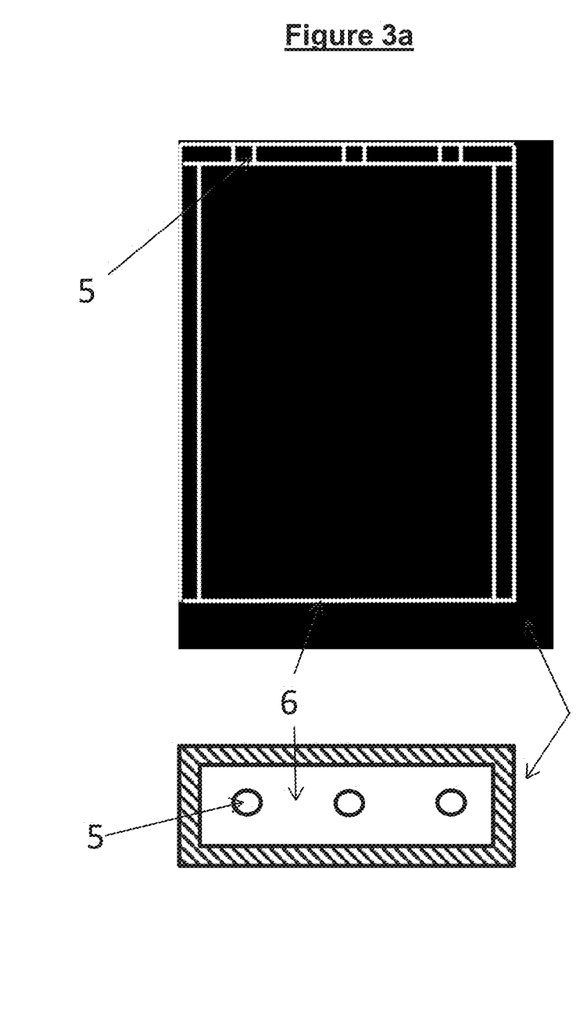
FIGS. 3a, 3b and 3c each depict, in section, one type of nozzle that can be used as distribution means in the device according to the invention.

FIG. 3a depicts a first variant of nozzle that can be used as distribution means in the device according to the invention, in a view from above and in transverse section. The passage cross section of the nozzle 3 is rectangular. Three restriction orifices 5 are arranged at the inlet of the nozzle.

Figure 3B:
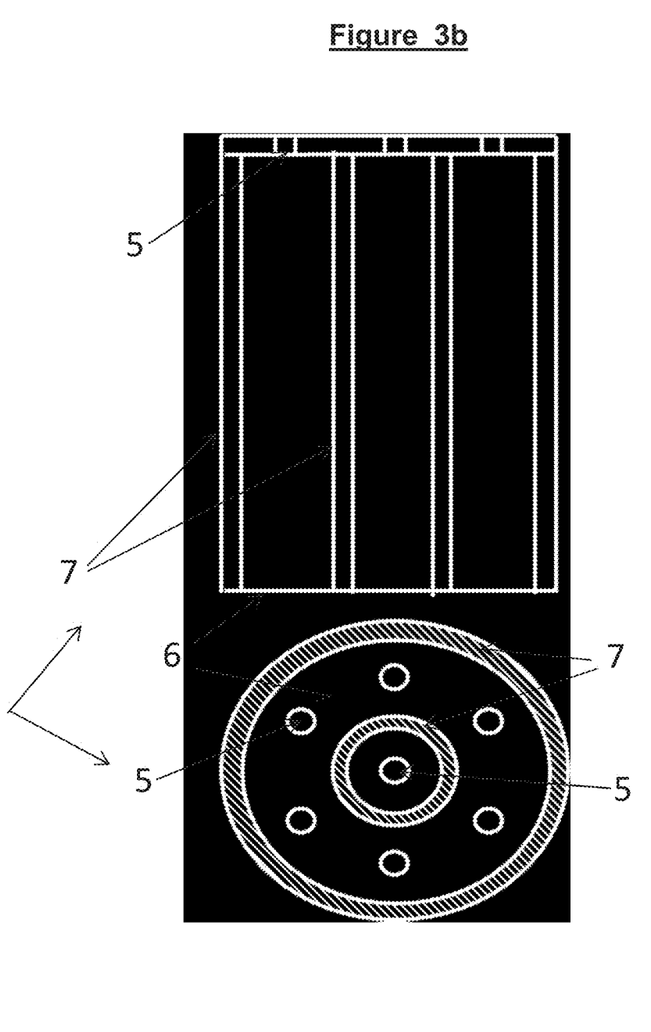

FIG. 3b depicts a second variant of nozzle that can be used as distribution means in the device according to the invention, in a view from above and in transverse section. The nozzle 3 is formed of two concentric cylinders 7. At the center of the central cylinder, there is a restriction orifice 5. Six restriction orifices 5 are distributed in the annular region situated between the two cylinders.

Figure 3C:
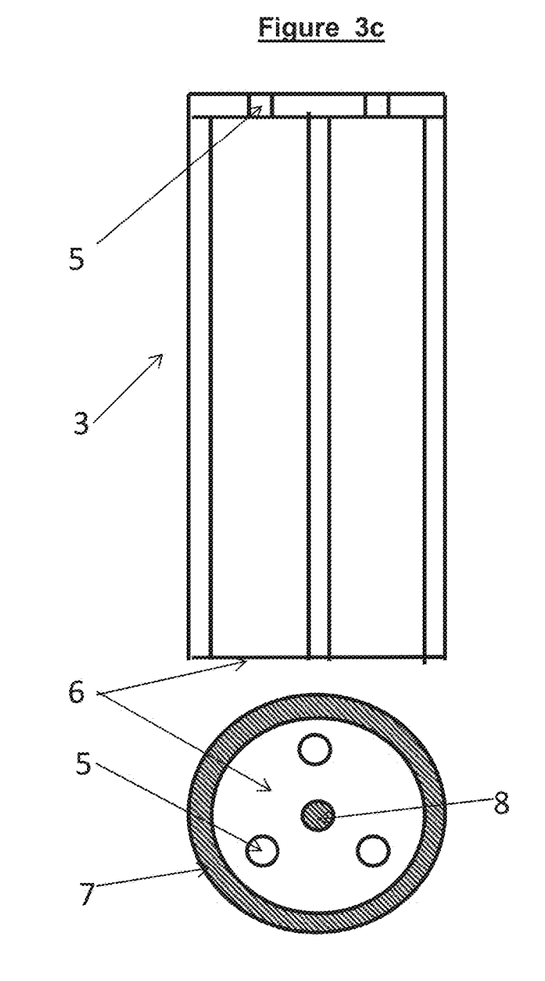

FIG. 3c depicts a third variant of nozzle that can be used as distribution means in the device according to the invention, in a view from above and in transverse section. The nozzle 3 is formed of a cylinder 7 at the center of which a rod 8 is positioned. Three restriction orifices 5 are inscribed on a median circle.

Figure 4:
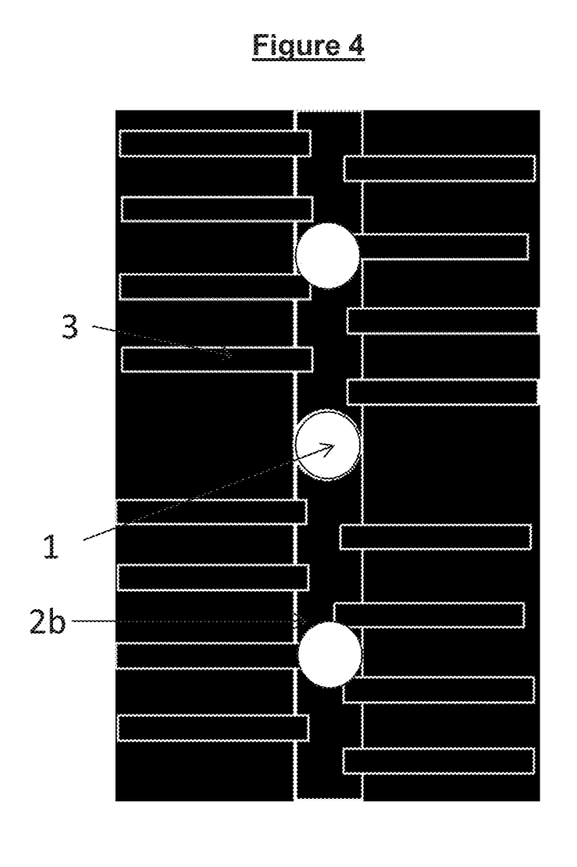
FIGS. 4 and 5 depict views from above of two other examples of the distribution device according to two other variants of the invention.

FIG. 4 depicts a view from above of a second example of the distribution device D according to a second variant of the invention. The device according to the invention comprises manifold means consisting of a straight cylindrical pipe 2b and of the cylindrical conveying pipes 1. Nozzles 3 are distributed along the two sides of the straight cylindrical pipe 2b. In this configuration, the length of the nozzles contributes to the stability of the device D.

Figure 5:
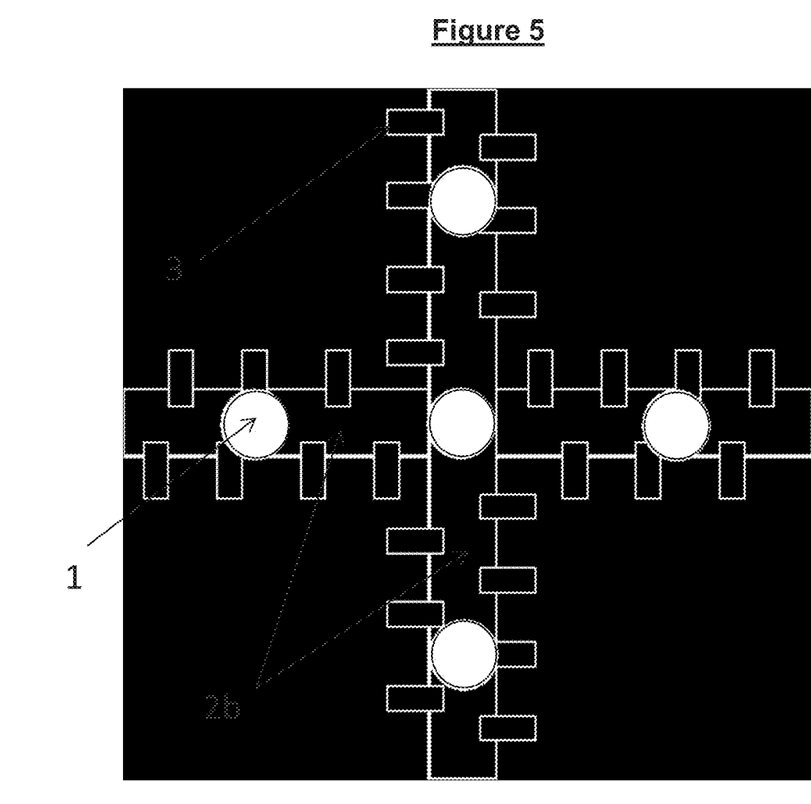

FIG. 5 depicts a view from above of another example of the distribution device D according to another variant of the invention. The device according to the invention comprises manifold means consisting of two straight cylindrical pipes 2b, assembled in the form of a cross, and of five cylindrical conveying pipes 1. Nozzles 3 are distributed along the two straight cylindrical pipes.

Figure 6:
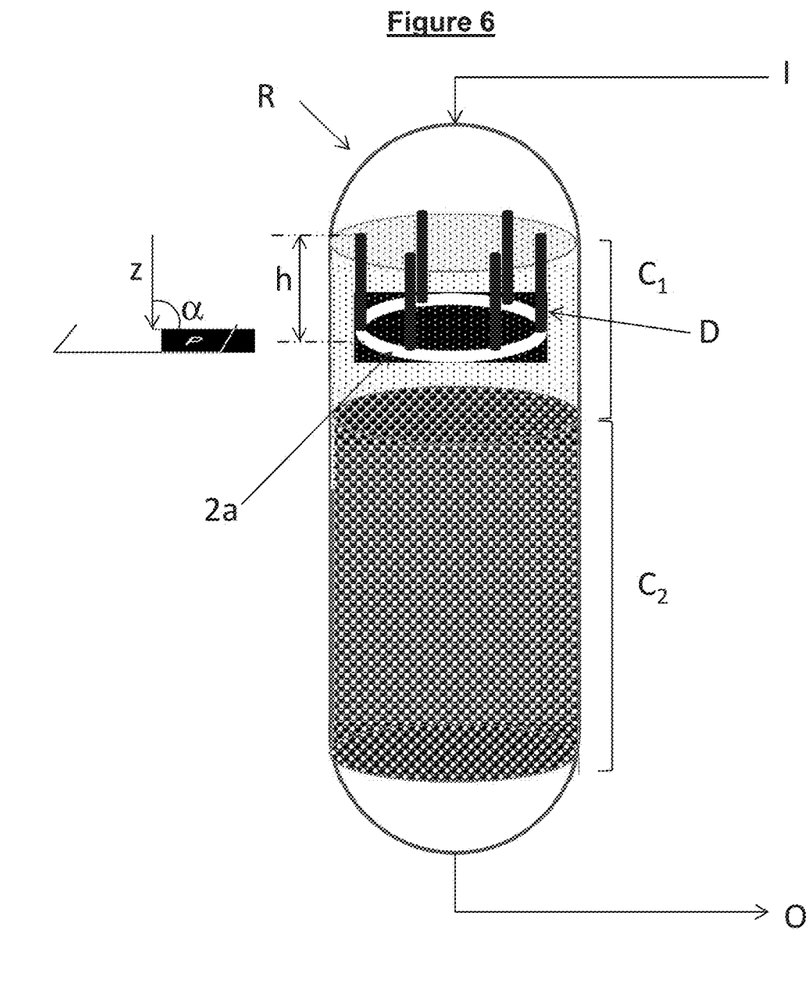
FIG. 6 depicts the distribution device D of FIG. 1 arranged inside a reactor R according to a first variant of the invention, in "simple mode".

FIG. 6 depicts the distribution device D, of the example of FIGS. 1a and 1b, arranged inside a reactor R, along a vertical axis z, according to a first variant of the invention, in "simple mode". The reactor R is operated in downflow gas mode with a fixed bed, liable to fouling, in which the device D according to the invention is embedded. The fluid that is to be distributed (the feedstock) enters via the pipe I in gaseous form and leaves via the pipe O. The upper layer $C_1$ of the catalytic bed is made up, in this example, of packing elements. The fixed catalytic bed comprises a second layer $C_2$. The distribution device D comprises conveying means, consisting of the pipes 1, which extend along the axis z, and manifold means, consisting of a ring 2a, which extend in the plane P. The axis z is coincident with the axis of the reactor R, and the plane P is parallel to the transverse section of the reactor.

The ring 2a is provided with nozzles, not depicted, suitably distributed about its circumference.

The ring 2a rests horizontally on the elements of the layer $C_1$. Thus, the distribution device D is set down on the catalyst, preferably at a horizontal level situated between 20% and 80% of the height of said layer, and more preferentially between 40% and 60%. The inlets of the conveying pipes 1 are situated above the level of the layer $C_1$.

When the catalytic bed becomes fouled, the device D allows the layer of catalytic bed to be bypassed by a height h corresponding to the height of the device.

Figure 7:
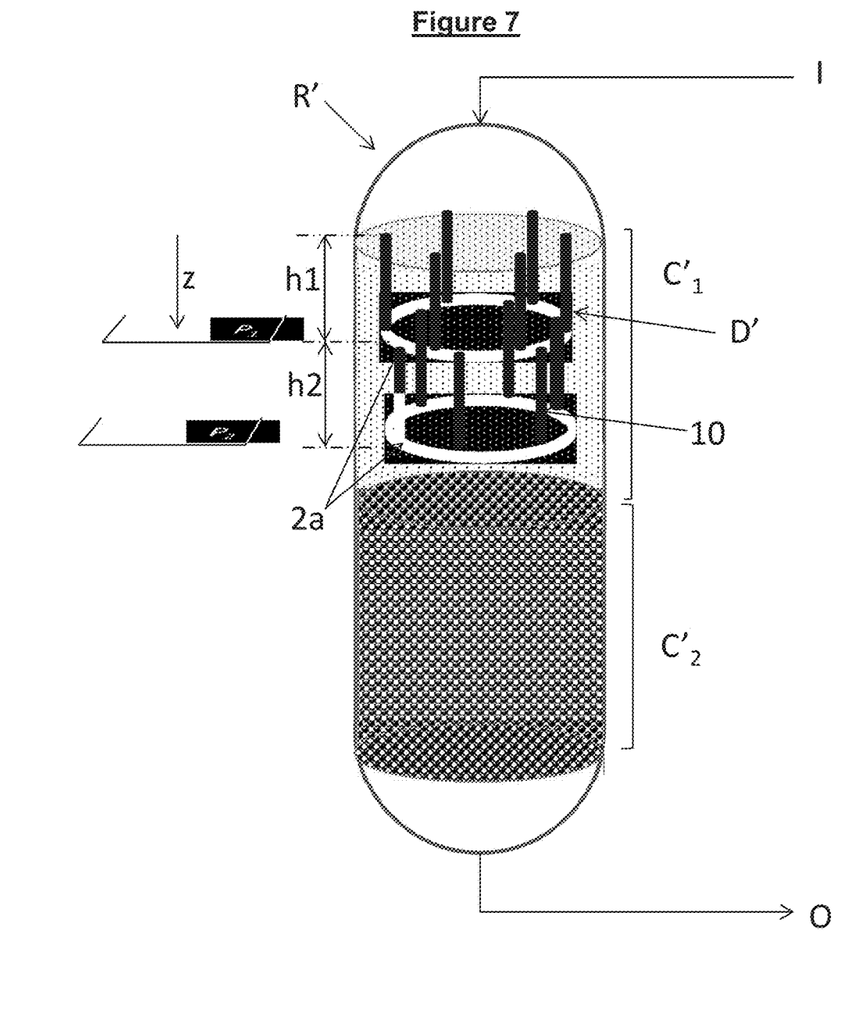
FIG. 7 depicts the distribution device D arranged inside a reactor R according to a second variant of the invention, in "tiered mode".

FIG. 7 depicts the distribution device D' arranged inside a reactor R' according to a second variant of the invention, in "tiered mode". The reactor R' is very similar to the reactor R of FIG. 6. The distribution device D' is in part identical to the distribution device D. The difference is that it comprises two manifold means, consisting of two superposed rings 2a. The upper ring extends in a plane $P_1$ orthogonal to the axis z, and the lower ring extends in a plane $P_2$ which is parallel to $P_1$. The two rings 2a are connected by transfer means, consisting of cylindrical pipes 10 extending along the axis z. The two rings 2a are provided with nozzles, not depicted.

The second ring 2a rests horizontally on elements constituting the layer $C_1'$. Thus, the distribution device D' is set down on the catalyst such that:
- the first ring is situated preferably at a horizontal level situated between 20% and 50% of the height of said layer, and more preferentially between 25% and 40%.
- the second ring is situated preferably at a horizontal level situated between 50% and 80% of the height of said layer, and more preferentially between 60% and 75%.

The inlets of the conveying pipes 1 are situated above the level of the layer $C_1'$.

When the catalytic bed becomes fouled, the device D' allows the layer of catalytic bed $C_1'$ to be bypassed by a height $h_1$ and then by a height $h_2$.

Example 1

A reactor R of diameter 1.4 m is provided with a device D according to the invention in simple mode, as in FIG. 5, in a variant of the device analogous to that depicted in FIGS. 1a and 1b. A feedstock of cracked naphtha in gaseous form is processed at 500 m3/h. The device is installed in a layer of catalytic bed which layer is made up of packing elements having a diameter of 51 mm.

A ring 2a with a torus diameter of 1 m is installed in the reactor. The ring, having a cross section of a nominal diameter of 50 mm, receives the fluid from 6 conveying pipes consisting of hollow cylinders with a nominal diameter of 50 mm.

24 nozzles with an internal diameter of 48 mm and a length of 125 mm are distributed on the ring. Each nozzle is equipped at its inlet with a restriction orifice of a diameter of 19 mm.

The time taken to mount the device in the reactor is estimated at 20 minutes, whereas the devices of the prior art with several adjacent devices require several hours.

Example 2

A reactor of diameter 3.8 m is provided with three devices in simple mode according to the invention, these being arranged concentrically, in order to process a feedstock of naphtha in gaseous form at 4400 m3/h. The devices are installed in a layer of catalytic bed which layer is made up of packing elements having a diameter of 51 mm.

The manifold means of each of the three devices consist of a ring of toric shape and of cylindrical cross section. The three rings are arranged concentrically, in the one same plane, and their respective torus diameters are 1 m, 2 m and 3 m. The rings have a nominal diameter of 75 mm, and respectively receive the fluid from 4, 8 and 12 conveying pipes. These have a nominal diameter of 75 mm.

128 nozzles with an internal diameter of 48 mm and a length of 125 mm are distributed on the 3 toruses which comprise 22 nozzles, 42 nozzles and 64 nozzles, respectively. Each nozzle is equipped at its inlet with a restriction orifice of a diameter of 19 mm.

The time taken to mount the device in the reactor is estimated at 50 minutes, whereas the devices of the prior art with several adjacent devices require a day.

The invention claimed is:

1. A device (D) for distributing a fluid, wherein the device feeds a fixed catalytic bed ($C_1$, $C_2$; $C'_1$, $C'_2$) of a reactor (R) with a reactant, said device comprising:
    an upstream fluid conveyer comprising a plurality of pipes (1) each directly receiving a distinct share of said fluid,
    a downstream fluid distributer (3),
    a pressure reducing member,
    wherein the device comprises a manifold (2a; 2b) for collecting said fluid together, and providing a direct fluidic connection between the pipes of said fluid conveyer (1) and said fluid distributer (3),
    wherein said pressure reducing member is added on to said fluid conveyer (1) or fluid distributer (3) or manifold (2a; 2b).

2. The device of claim 1, additionally comprising a plurality of fluid distributers (3), a plurality of manifolds (2a; 2b), and a fluid connector (10);
    wherein said manifolds (2a; 2b) are arranged one below the other,
    wherein said fluid connector (10) provide a fluidic connection between the plurality of the manifolds (2a; 2b).

3. The device of claim 1, wherein the manifold for collecting said fluid comprise at least one tube or an array of tubes (2b), to which the pipes of the fluid conveyer (1) are connected, said tube or tubes (2b) being closed at their ends.

4. The device of claim 1, wherein said array of tubes (2b) is arranged in the form of a cross, a network, a grid or a star.

5. The device of claim 1, wherein the manifold for collecting said fluid comprise at least one ring (2a), to which the pipes (1) of the fluid conveyer are connected.

6. The device of claim 1, wherein said fluid conveyer (1) and/or a fluid connector (10) extend along an axis (z) and each of said fluid-collecting manifolds (2a; 2b) extend in a plane (P), such that the axis (z) and the plane (P) form an angle ($\alpha$) comprised between 60 and 120 degrees.

7. The device of claim 1, wherein said pressure reducing member comprises a restriction in the cross section for passage of the fluid of the restriction orifice (5), local narrowing or bellows type.

8. The device of claim 1, wherein said fluid distributer comprises a plurality of nozzles (3), connected to said manifold (2a; 2b).

9. The device of claim 1, wherein the angle of connection ($\beta$) of the body of said nozzles with respect to the manifold is comprised between 60 and 120 degrees.

10. The device of claim 1, wherein the pressure reducing member (5) is added on to the fluid distributer in the vicinity of the region of connection to said manifold (2a; 2b).

11. A reactor (R), comprising:
    a fixed catalytic bed ($C_1$, $C_2$; $C'_1$, $C'_2$)
    a distribution device (D) as claimed in claim 1, arranged in said bed in such a way that the inlet or at least one of the inlets of the pipes (1) of the fluid conveyer of said device are upstream of or flush with said bed, and the manifold (2a; 2b), fluid distributer (3) and optionally fluid connector (10) of said device are in said bed.

12. The reactor (R) of claim 11, wherein said manifold of said device extend in a plane (P) orthogonal to the axis (z) of said reactor (R).

13. The reactor of claim 11, wherein said fixed catalytic bed supports the device.

14. The reactor of claim 11, wherein the catalytic bed contains catalytic elements and wherein the dimensions of the outlets of each of said fluid distributers are strictly smaller than the smallest dimension of said elements at the level of which the fluid is distributed.

15. A process wherein the device (D) of claim 1 is/are implemented, wherein a feedstock comprising naphtha, is hydrotreated, or wherein a cracked petroleum feedstock is selectively hydrogenated, or wherein a gas is cleaned of its impurities by adsorption.

16. The device of claim 2 wherein the plurality of manifolds comprise at least two superposed rings.

17. The device of claim 16 wherein the at least two superposed rings comprise an upper and lower ring wherein the upper ring extends in a plane ($P_1$) orthogonal to the axis (z), and the lower ring extends in a plane ($P_2$) which is parallel to ($P_1$).

18. The device of claim 17 wherein the upper and lower rings are connected by the fluid connector, wherein said fluid connector comprises cylindrical pipes extending along the axis (z).

19. A process wherein the reactor (R) of claim 11 is/are implemented, wherein a feedstock comprising naphtha, is hydrotreated, or wherein a cracked petroleum feedstock is selectively hydrogenated, or wherein a gas is cleaned of its impurities by adsorption.

* * * * *